United States Patent [19]
Takeda

[11] Patent Number: 4,695,421
[45] Date of Patent: Sep. 22, 1987

[54] METHOD OF MOLDING A MEMBER HAVING UNDERCUT PORTIONS

[75] Inventor: Masami Takeda, Ami, Japan

[73] Assignee: Canon Kabushiki Kaisha, Tokyo, Japan

[21] Appl. No.: 772,712

[22] Filed: Sep. 5, 1985

[30] Foreign Application Priority Data

Sep. 19, 1984 [JP] Japan .................. 59-196178

[51] Int. Cl.$^4$ .................. B29C 33/44; B29C 45/44
[52] U.S. Cl. .................. 264/318; 249/178; 425/441; 425/DIG. 58
[58] Field of Search .................. 264/318, 334; 249/180, 249/63, 59, 178, 152; 425/DIG. 58, 441

[56] References Cited

U.S. PATENT DOCUMENTS

| T890,013 | 9/1971 | Lawrence | 18/5 BB |
|---|---|---|---|
| 2,948,031 | 8/1960 | Webb | 164/340 |
| 3,373,460 | 3/1968 | Ladney, Jr. | 18/42 |
| 3,431,967 | 3/1969 | Hipp, Jr. | 164/6 |
| 3,655,323 | 4/1972 | Hall | 425/438 |
| 4,005,101 | 1/1977 | Ruch | 264/318 |
| 4,019,711 | 4/1977 | Altenhof et al. | 249/59 |
| 4,115,505 | 9/1978 | Metabi | 264/242 |
| 4,130,264 | 12/1978 | Schröer | 249/178 |
| 4,362,291 | 12/1982 | Fuke et al. | 249/144 |
| 4,533,123 | 8/1985 | Von Holdt | 425/438 |
| 4,541,795 | 9/1985 | Cole | 425/437 |

FOREIGN PATENT DOCUMENTS

| 1072363 | 6/1954 | Fed. Rep. of Germany . |
|---|---|---|
| 1097091 | 4/1957 | Fed. Rep. of Germany . |
| 3405583 | 8/1984 | Fed. Rep. of Germany . |
| 0078716 | 5/1983 | Japan .................. 264/318 |

Primary Examiner—Jan H. Silbaugh
Assistant Examiner—Karen D. Kutach
Attorney, Agent, or Firm—Fitzpatrick, Cella, Harper & Scinto

[57] ABSTRACT

This specification discloses a method of molding an article having undercut portions by the use of a plurality of divided cores or core sections combined together to form a unitary mold and having therein through-holes every other of which is different in shape, each of the through-holes having an angle of inclination with respect to a predetermined axis. The method includes the steps of disposing the divided cores on a reference plate to form a divided mold and inserting moving pins into the through-holes, pouring a material between a fixed mold and the divided mold and molding a molded article, and moving the pins inserted in the through-holes of the divided cores constituting the divided mold in the direction of the predetermined axis, whereby of the divided cores, one group of cores having the through-holes of the same shape is first separated from the molded article, and then the other group of cores is separated from the molded article. The specification also discloses an apparatus for carrying out such method.

2 Claims, 9 Drawing Figures

METHOD OF MOLDING A MEMBER HAVING UNDERCUT PORTIONS

BACKGROUND OF THE INVENTION

1. Field of the Invention

This invention relates to a method of and an apparatus for molding an article having undercut portions such as cross holes provided in the inner peripheral surface of a helicoid screw or a cylinder member by the use of a core.

2. Description of the Prior Art

Figure 1:
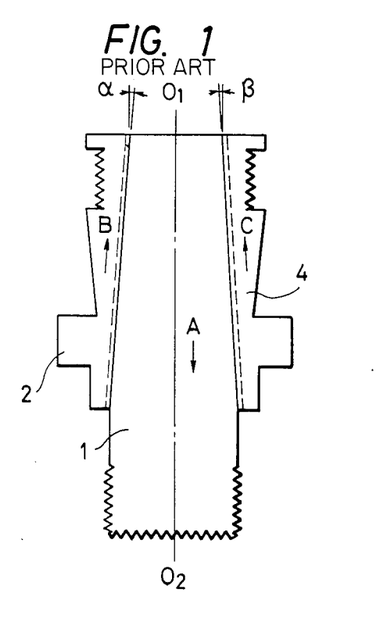
FIG. 1 illustrates the prior art.

Various methods of molding a member having undercut portions have heretofore been proposed. As one of them, there is the open core mounted on a mold for injection molding shown in U.S. Pat. No. 4,130,264. However, the open core disclosed in this patent adopts a construction as shown in FIG. 1 of the accompanying drawings wherein slide cores 2 and 4 for forming an undercut portion relative to a core bar 1 are moved as indicated by arrows A, B and C in the thrust direction relative to an axis $O_1-O_2$, and in any of a case where the slide cores are opened and a case where the slide cores are closed, the core bar 1 and the slide cores 2 and 4 are positioned by a guide member not shown in FIG. 1. Therefore, high accuracy of the molded article cannot be ensured unless the accuracy of the angle of inclination $\alpha$ of the slide core 2 with respect to the core bar 1 and the accuracy of the angle of inclination $\beta$ of the slide core 4 with respect to the core bar 1 and the accuracy of fitting of the slide cores 2 and 4 are kept high. Thus, the finish accuracy and durability of the metal mold are greatly required, and this involves much difficulty in the manufacture of the metal mold. Also, to ensure smooth relative movement between the core bar 1 and the slide cores 2, 4, a clearance is required therebetween, but such clearance greatly affects the finish accuracy of the molded article and it becomes difficult to obtain products of high accuracy.

SUMMARY OF THE INVENTION

It is a first object of the present invention to provide a molding method and an apparatus which can keep the finish accuracy of molded articles high.

It is a second object of the present invention to provide a molding method which requires no clearance between mold parts during the step of removing a molded article and in which the mold parts are in intimate contact with each other and the mutual positional relation therebetween can be kept at high accuracy, whereby the finish accuracy of the molded article can be made high.

It is a third object of the present invention to provide a molding method in which divided cores for the undercut portions of a molded article are separated by being moved in a direction perpendicular to an axis at different times, whereby the undercut portions of the molded article are not injured.

It is a fourth object of the present invention to provide a molding method which has many excellent features including that every other divided core of a plurality of divided cores or core sections is moved at different times. Therefore, the divided cores or core sections can be parted without injuring molded articles of great thickness and undercut portions of fine minute shape.

DESCRIPTION OF THE PREFERRED EMBODIMENT

Figure 2:
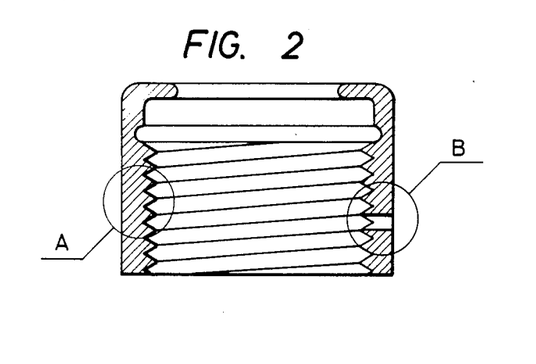
FIG. 2 is a cross-sectional view of a molded article manufactured by a method according to an embodiment of the present invention.

A preferred embodiment of the present invention will hereinafter be described with reference to the drawings. The present embodiment is described with respect to the molding of the lens barrel portion of a camera as shown in FIG. 2, although the present invention is not restricted thereto. In FIG. 2, undercut portions are an internal threaded portion designated by A, a through hole B, etc., and as other examples of the undercut portions, there is a projected portion, an inward depression, a hollow portion, etc., and the method or apparatus of the present invention can also be applied to these.

FIGS. 3A to 3E show an axial cross-section of the essential portions of a molding apparatus using the present invention.

In FIGS. 3A to 3E, reference numeral 8 designates a fixed mold plate having a hollow portion 8a, and reference numeral 10 denotes a cover having an inlet 10a for resin material and fixed to the fixed mold plate 8. Reference numerals 12, 14 and 16 designate first, second and third movable mold plates, respectively. Reference numeral 18 denotes a receiving plate, and reference numerals 20 and 22 designate first and second ejector plates, respectively. Reference numeral 24 denotes a center pin which is held by the first ejector plate 20 and extends through the central hole 18a of the receiving plate 18. The end 24a of the center pin 24 extends to the central portion of a core 26 which will later be described.

Reference numeral 28 designates a tapered pin fitted to the center pin 24. The tapered pin 28 is fixed to the third movable mold plate 16.

Figure 4A:
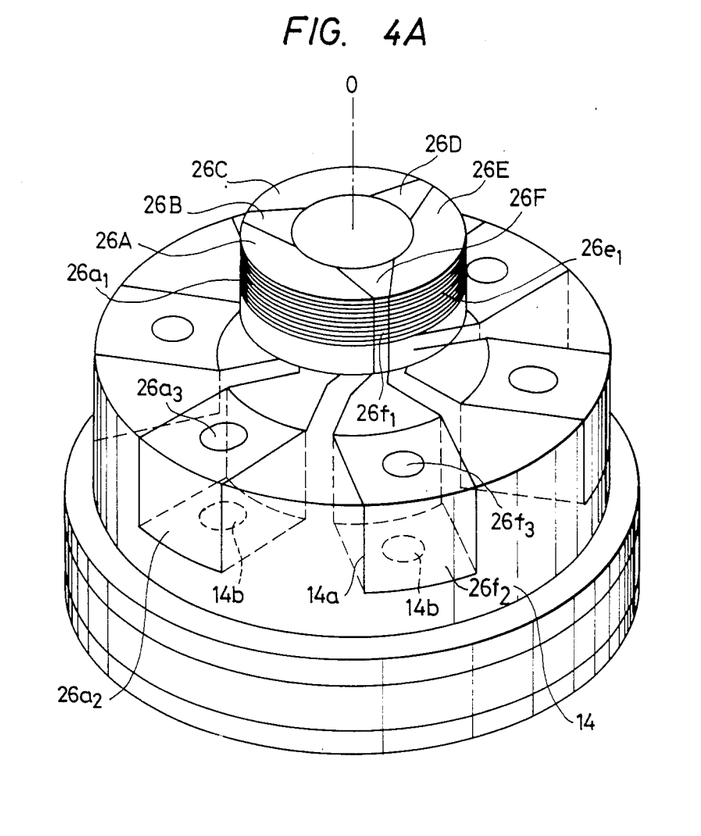
FIGS. 4A and 4B show the positional relations between divided cores 26A–26F and a second movable mold plate 14.
Figure 4B:
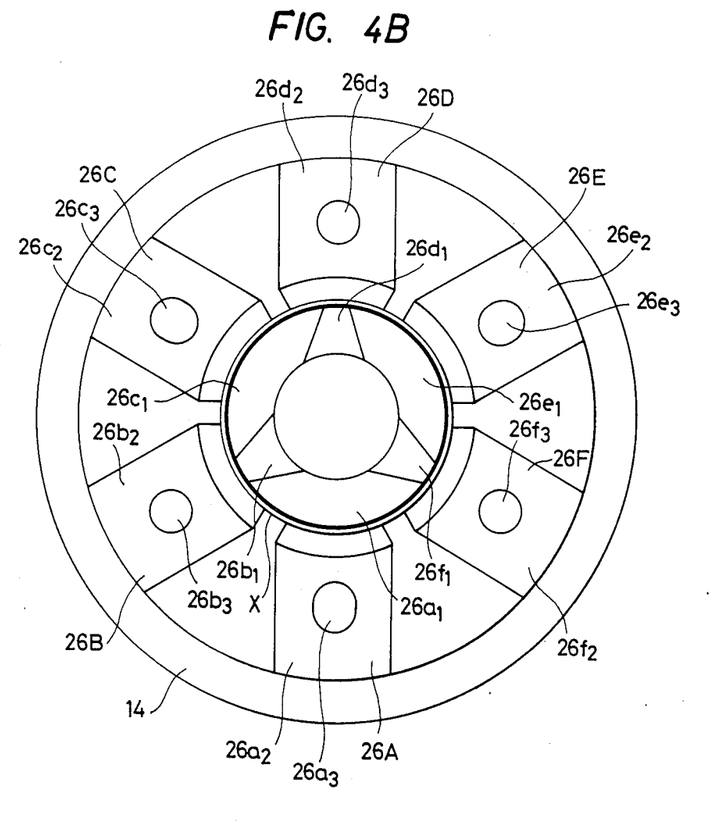

The core 26, as shown in FIGS. 4A and 4B, comprises six divided cores or core sections 26A, 26B, 26C, 26D, 26E and 26F held on the second movable mold plate 14, and the respective divided cores comprise article molding portions $26a_1$ ($26b_1$, $26c_1$, $26d_1$, . . . not shown in FIG. 4A), $26e_1$, $26f_1$ and holder portions $26a_2$ ($26b_2$, $26c_2$, $26d_2$, $26e_2$, . . . not shown in FIG. 4A), $26f_2$.

The holder portion $26a_2$, . . . , $26f_2$ of each divided core fits in a slide groove 14a formed in the second movable mold plate 14, and each divided core 26A–26F is constructed so as to be slidable radially along the slide groove 14a about an axis $O_1-O_2$.

The arrangement of the divided cores 26A–26F is such that, as shown in FIG. 4A, the divided cores 26A, 26C, 26E having wide outer peripheral arcuate surfaces $26a_1$, $26c_1$, $26e_1$ and the divided cores 26B, 26D, 26F having narrow outer peripheral arcuate surfaces $26b_1$, $26d_1$, $26f_1$ are arranged alternately.

Turning back to FIGS. 3A–3E, reference numeral 30 designates a telescopic member disposed around the core 26. Reference numeral 32 denotes a lid plate fixed to the top of the center pin 24.

Figure 3A:
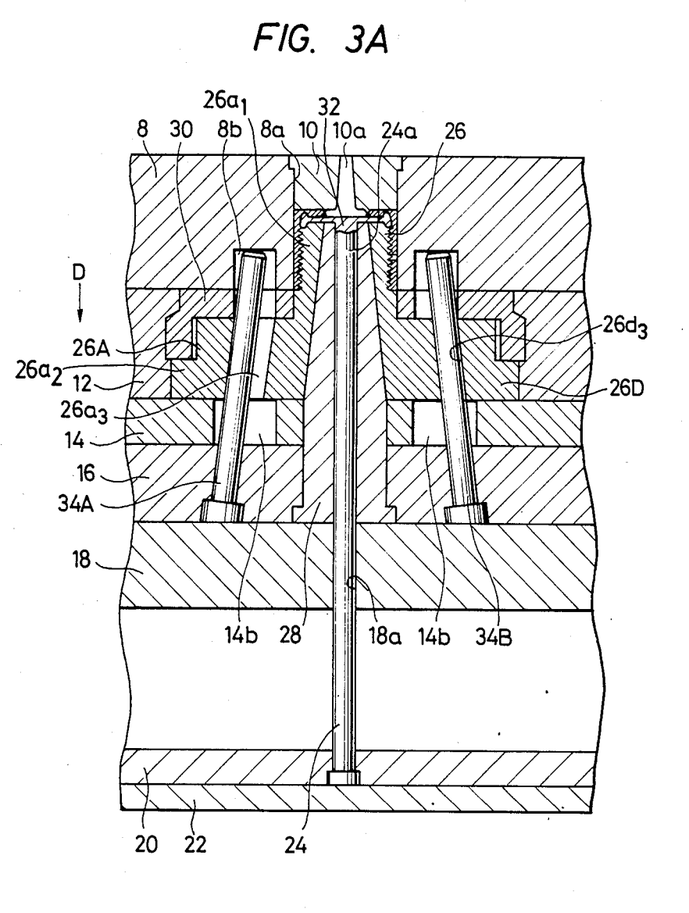
FIGS. 3A–3E are cross-sectional views of essential portions taken along the axial direction of the center pin of an apparatus according to an embodiment of the present invention, FIG. 3A showing the state before a resin material is poured, FIGS. 3B, 3C and 3D showing the arrangement during the step of separating the core from a molded article, and FIG. 3E showing the arrangement in a state in which the molded article has been removed from the apparatus.

In FIG. 3A, the outer peripheral surfaces of the divided cores 26A–26F, the inner peripheral surface of the fixed mold plate 8, the lid member 32 and the cover 10 together constitute a cavity portion. A fluid material such as plastic is poured into this cavity portion through a hole 10a, whereby the member as shown in FIG. 2 is molded.

Designated by 34A and 34B are moving pins fixed to the third movable mold plate 16. The moving pin 34A extends through a guide hole 14b formed in the second movable mold plate 14 and through a guide hole $26a_3$ formed in the holder portion $26a_1$ of the divided core 26A and fits in a hole 8b formed in the fixed mold plate 8.

One moving pin 34 is provided correspondingly to each of the divided cores 26A–26F and thus, the total number of moving pins 34 is six (34A–34F), and like the aforedescribed moving pin 34A, the other moving pins 34B–34F fit in the slot 14b of the second movable mold plate 14 and in guide holes $26b_3$–$26f_3$ formed in the holder portions $26b_2$–$26f_2$ of the respective divided cores. As regards guide holes $26a_3$–$26f_3$ formed in the holder portions $26a_2$–$26f_2$ of the divided cores, the guide holes $26a_3$, $26c_3$, $26e_3$ of the divided cores 26A, 26C, 26E having large outer peripheral arcuate surfaces are somewhat elongated in the radial direction and the other guide holes $26b_3$, $26d_3$, $26f_3$ are substantially circular, as shown in FIG. 4B.

After a predetermined amount of resin material has been poured into said cavity portion and the necessary cooling process has been terminated, the molded article is removed, and the removal of the molded article will hereinafter be described with reference to FIGS. 3A–3E.

Figure 3B:
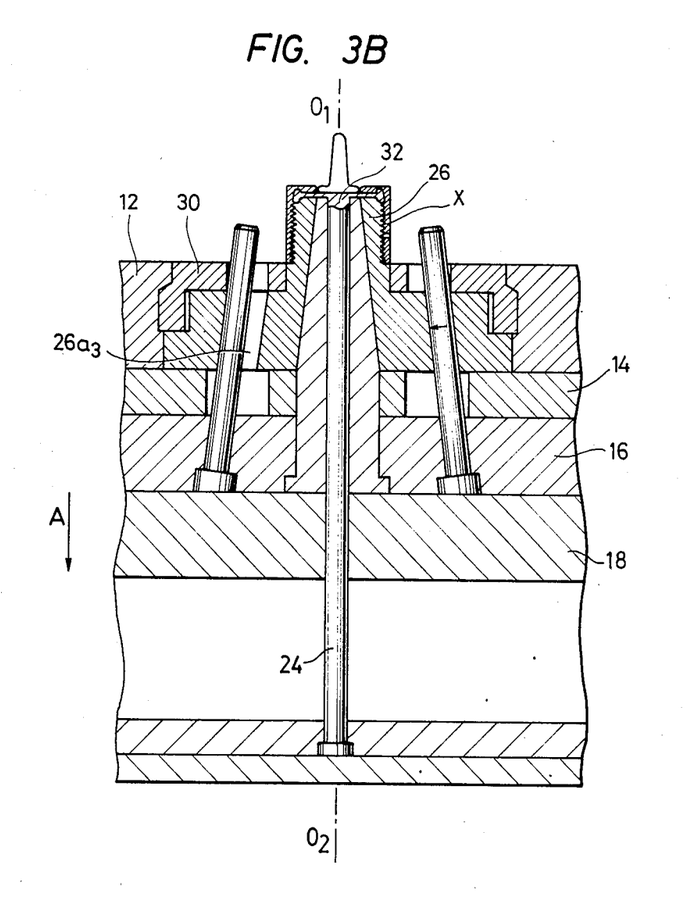

First, in the state of FIG. 3A, that is, after the termination of the molding, the fixed mold plate 8 is left and the movable portions 12, 14, 16, 18, 20 and 22 of the first to third movable mold plates are moved in the direction of arrow D. FIG. 3B shows a state in which the fixed mold plate 8 has been removed.

By all the movable portions being moved in the direction of arrow D, the outer peripheral surface of a molded article X is exposed as shown in FIG. 3B.

Figure 3C:
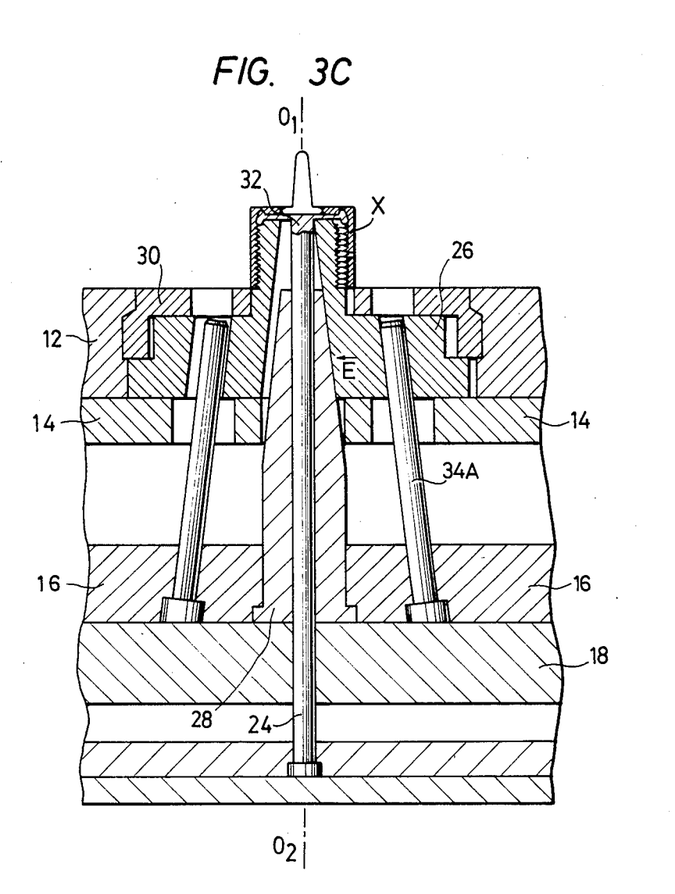

Subsequently, from the state of FIG. 3B, the third movable mold plate 16 and the receiving plate 18 are lowered in the direction of arrow A, and the space between the second movable mold plate 14 and the third movable mold plate 16 is opened as shown in FIG. 3C.

During this operation, the tapered pin 28 and the six moving pins 34A–34F are also moved in the direction of arrow A with the third movable mold plate 16, as shown in FIG. 3C. In the stroke from FIG. 3B to FIG. 3C, of the divided cores 26A–26F fitted to the moving pins 34A–34F, the divided cores 26B, 26D and 26F having the substantially circular guide holes $26b_3$, $26d_3$ and $26f_3$ respectively, move in a direction perpendicular to the axis $O_1$–$O_2$ (direction E) with the movement of the moving pins, whereby the three divided cores 26B, 26D and 26F are first separated from the undercut portions of the molded article X.

At this time, the moving pins 34A, 34C and 34E only move in the guide holes $26a_3$, $26c_3$ and $26e_3$ which are in the form of slots and therefore, the cores 26A, 26C and 26E are not moved by the moving pins 34A, 34C and 34E, but remain stopped in their positions during the molding.

Figure 3D:
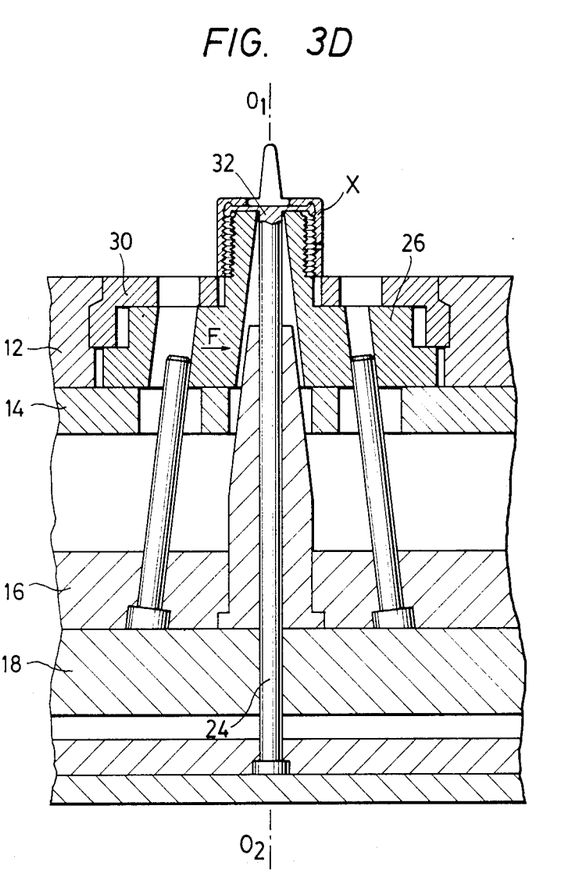

When the second movable mold plate 14 and the third movable mold plate 16 are further opened from the state of FIG. 3C to the state of FIG. 3D, the end portions of the slot-like guide holes $26a_3$, $26c_3$ and $26e_3$ of the divided cores 26A, 26C and 26E which have remained stopped as previously mentioned are engaged by the moving pins 34A, 34C and 34E, and with the axial movement of the moving pins 34A, 34C and 34E, the remaining divided cores 26A, 26C and 26E also move in a direction perpendicular to the axis $O_1$–$O_2$ (direction F), whereby the remaining divided cores are separated from the undercut portions of the molded article X.

By the state of FIG. 3D, all the divided cores 26A–26F are separated from the molded article X.

Figure 3E:
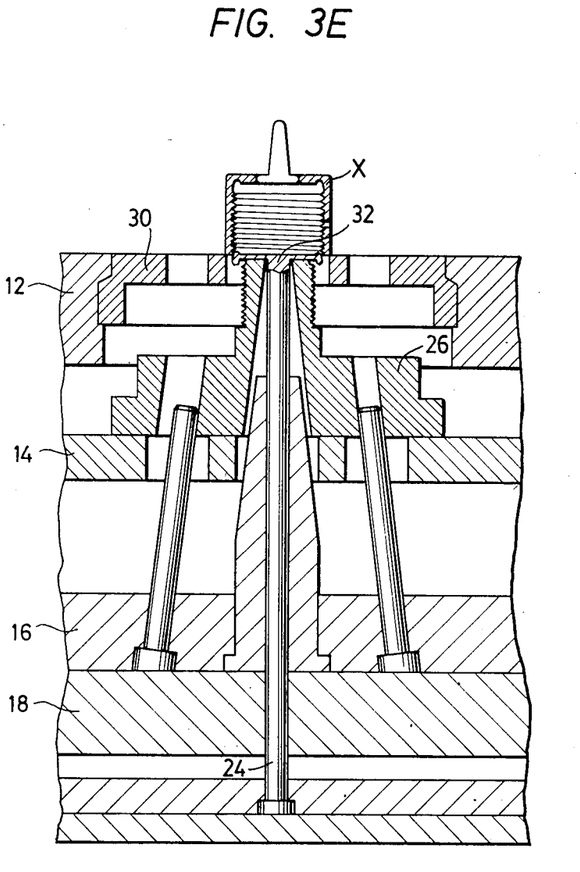

Subsequently, the space between the first movable member 12 and the second movable member 14 is opened as shown in FIG. 3E, whereby the molded article X can be completely separated from the metal mold.

The present invention is a method of molding undercut portions wherein a core for forming the inner peripheral surface of a molded article having undercut portions is divided into a plurality of cores, a center pin is disposed inside each of the divided cores, moving pins 34A–34F each having a predetermined angle of inclination with respect to the axis $O_1$–$O_2$ of said center pin are fitted, guide holes $26a_3$–$6f_3$ for fitting said moving pins therein are formed in said divided cores, said guide holes $26a_3$–$26f_3$ are alternatively slot-like and substantially circular, whereby each of said divided cores is made movable in a direction perpendicular to the axis of the center pin by the utilization of the angle of inclination of the moving pins with respect to the guide holes and by said guide holes being alternately slot-like and substantially circular, the divided cores are moved with the movement timing thereof in said perpendicular direction being divided into two stages and the divided cores are separated from the undercut portions of the molded article, and an apparatus used therefor.

In the present embodiment shown in FIG. 3A, the cavity portion which affects the finish accuracy of the molded article is formed by the divided core 26, the fixed mold plate 8 and the lid members 32 and 10, and these parts are highly accurately held in place and therefore, the dimensional accuracy of the cavity portion is kept high.

In the foregoing description, every other of the guide holes $26a_3$–$26f_3$ has been described as being slot-like, whereas these guide holes are not limited to the slot-like shape, but may be substantially circular holes having a larger diameter than the other substantially circular holes. This is because, again in such case, the divided cores can be moved with their movement timing in said perpendicular direction being divided into two stages. Also, in such case, there is an advantage in that the divided cores are easier to manufacture.

In the above-described embodiment, there has been described a method of molding an article having undercut portions on the inner surface thereof, but the present invention is equally applicable to an article having undercut portions on the outer surface thereof.

What is claimed is:

1. A method for forming an under-cut portion of a molded article, using a molding apparatus comprising:

a fixed mold plate having a circular hollow portion including an inner peripheral wall defining a cavity for molding the article;

a tapered pin, in the center of which a through-hole is provided, a center pin passing through said through-hole;

a plurality of movable molding plates;

a plurality of core sections supported by said movable molding plates, said core sections forming a core including an outer peripheral surface of cylindrical shape when they are combined; and a plurality of moving pins, positioned at an inclination angle with respect to a center line of said center pin, and passing through guide holes defined by said movable molding plates and said core sections;

each core section comprising a cylindrical article molding portion projecting into said hollow portion and having an undercut portion, and a holder portion, in which a guide hole for one of said moving pins is provided, the cylindrical article molding portions of said core sections when combined forming said outer peripheral surface of cylindrical shape and having alternating wide outer peripheral arcuate surfaces and narrow outer peripheral arcuate surfaces, said guide holes of said core sections having wide outer peripheral arcuate surfaces being of greater dimension, in a radial direction with respect to an axial line of said center pin, then said guide holes of said core sections having narrow outer periperal arcuate surfaces;

the method comprising the steps of:

(a) injecting the molding material into the cavity defined by the inner peripheral wall of the hollow portion of said fixed molding plate and the combined cylindrical article molding portions to form the molded article including undercut portions;

(b) moving said plurality of moving pins in a direction parallel to the center line of said center pin, so as to cause movement only of said core sections having narrow outer peripheral arcuate surfaces toward the center line of said center pin; and (c) further moving said plurality of moving pins in a direction parallel to the center line of said center pin, so as to cause movement of said core sections having wide outer peripheral arcuate surfaces toward the center line of said center pin.

2. The method as in claim 1, wherein said plurality of moving pins are moved in a direction parallel to the center line of said center pin by moving a movable molding plate to which said plurality of moving pins are fixed.

* * * * *

UNITED STATES PATENT AND TRADEMARK OFFICE
CERTIFICATE OF CORRECTION

PATENT NO. : 4,695,421

DATED : September 22, 1987

INVENTOR(S) : MASAMI TAKEDA

It is certified that error appears in the above-identified patent and that said Letters Patent is hereby corrected as shown below: Title page:

<u>AT [56] UNDER REFERENCES CITED/U.S. PATENT DOCUMENTS</u>

Line 11, "4,533,123  8/1985  Von Holdt.....425/438" should read --4,533,312  8/1985  Von Holdt.....425/438--.

<u>COLUMN 2</u>

Line 1, "BRIEF DESCRIPTION OF THE THE DRAWINGS" should read --BRIEF DESCRIPTION OF THE DRAWINGS--.

<u>COLUMN 4</u>

Line 34, "$26a_3-6f_3$" should read --$26a_3-26f_3$--.

Line 56, "whereas" should read --although--.

<u>COLUMN 5</u>

Line 2, "under-cut" should read --undercut--.

UNITED STATES PATENT AND TRADEMARK OFFICE
CERTIFICATE OF CORRECTION

PATENT NO. : 4,695,421
DATED : September 22, 1987
INVENTOR(S) : MASAMI TAKEDA

It is certified that error appears in the above-identified patent and that said Letters Patent is hereby corrected as shown below:

COLUMN 6

Line 3, "then" should read --than--.
Line 5, "periperal" should read --peripheral--.

Signed and Sealed this

Ninth Day of February, 1988

Attest:

DONALD J. QUIGG

Attesting Officer    Commissioner of Patents and Trademarks